United States Patent
Wein et al.

(10) Patent No.: US 9,009,711 B2
(45) Date of Patent: Apr. 14, 2015

(54) GROUPING AND PARALLEL EXECUTION OF TASKS BASED ON FUNCTIONAL DEPENDENCIES AND IMMEDIATE TRANSMISSION OF DATA RESULTS UPON AVAILABILITY

(75) Inventors: Enno Wein, Munich (DE); Vahagn Poghosyan, Munich (DE)

(73) Assignee: Enno Wein, Hayward, CA (US)

( * ) Notice: Subject to any disclaimer, the term of this patent is extended or adjusted under 35 U.S.C. 154(b) by 396 days.

(21) Appl. No.: 13/386,885

(22) PCT Filed: Jul. 26, 2010

(86) PCT No.: PCT/EP2010/004564
§ 371 (c)(1),
(2), (4) Date: Mar. 30, 2012

(87) PCT Pub. No.: WO2011/009638
PCT Pub. Date: Jan. 27, 2011

(65) Prior Publication Data
US 2012/0180068 A1    Jul. 12, 2012

(30) Foreign Application Priority Data
Jul. 24, 2009   (EP) .................................... 09009632

(51) Int. Cl.
G06F 9/46       (2006.01)
G06F 15/16      (2006.01)
G06F 9/50       (2006.01)
G06F 9/54       (2006.01)
G06F 9/48       (2006.01)

(52) U.S. Cl.
CPC .............. *G06F 9/4881* (2013.01); *G06F 9/546* (2013.01)

(58) Field of Classification Search
None
See application file for complete search history.

(56) References Cited

U.S. PATENT DOCUMENTS

| 5,886,707 A | 3/1999 | Berg .............................. 345/433 |
| 6,052,707 A | 4/2000 | D'Souza ........................ 709/106 |
| 6,948,172 B1 * | 9/2005 | D'Souza ........................ 718/106 |
| 6,961,934 B2 * | 11/2005 | Alford et al. .................. 718/100 |
| 8,001,266 B1 * | 8/2011 | Gonzalez et al. ............. 709/238 |
| 8,209,703 B2 * | 6/2012 | Yee et al. ...................... 718/106 |
| 8,599,202 B1 * | 12/2013 | Legakis et al. ................ 345/423 |

(Continued)

FOREIGN PATENT DOCUMENTS

| EP | 0 527 392 A2 | 2/1993 |
| EP | 1 450 257 A2 | 8/2004 |

(Continued)

OTHER PUBLICATIONS

Maier et al., "Distributed Resource Management for Parallel Applications in Networks of Workstations," *High-Performance Computing and Networking LNCS* vol. 1225:462-471, Jan. 1, 1997.

(Continued)

*Primary Examiner* — Emerson Puente
*Assistant Examiner* — Benjamin Wu
(74) *Attorney, Agent, or Firm* — Seed IP Law Group PLLC

(57) ABSTRACT

The present invention provides a particular efficient system of scheduling of tasks for parallel processing, and data communication between tasks running in parallel in a computer system. A particular field of application of the present invention is the platform-independent simulation of decomposition/partitioning of an application, in order to obtain an optimal implementation for parallel processing.

17 Claims, 7 Drawing Sheets

(56) References Cited

U.S. PATENT DOCUMENTS

| | | | |
|---|---|---|---|
| 2002/0016863 A1* | 2/2002 | Lurndal | 709/310 |
| 2003/0204576 A1* | 10/2003 | Yamada et al. | 709/220 |
| 2004/0015979 A1* | 1/2004 | Shen et al. | 718/107 |
| 2004/0078799 A1* | 4/2004 | Koning et al. | 719/313 |
| 2004/0107240 A1* | 6/2004 | Zabarski et al. | 709/201 |
| 2005/0005273 A1* | 1/2005 | Jones et al. | 718/108 |
| 2005/0283785 A1 | 12/2005 | D'Souza | 718/100 |
| 2006/0248218 A1* | 11/2006 | Kuribayashi | 709/232 |
| 2007/0021998 A1 | 1/2007 | Laithwaite et al. | 705/9 |
| 2007/0079300 A1* | 4/2007 | Du et al. | 717/149 |
| 2008/0082622 A1* | 4/2008 | Pong | 709/212 |
| 2008/0086626 A1* | 4/2008 | Jones et al. | 712/225 |
| 2008/0120592 A1* | 5/2008 | Tanguay et al. | 717/104 |
| 2008/0155197 A1* | 6/2008 | Li et al. | 711/130 |
| 2009/0007101 A1 | 1/2009 | Azar et al. | 718/1 |
| 2009/0064168 A1* | 3/2009 | Arimilli et al. | 718/105 |
| 2009/0070772 A1* | 3/2009 | Shikano | 718/106 |
| 2009/0259996 A1* | 10/2009 | Grover et al. | 717/136 |
| 2009/0295794 A1* | 12/2009 | Fan et al. | 345/419 |
| 2009/0300626 A1* | 12/2009 | Sturdy | 718/102 |
| 2010/0107174 A1* | 4/2010 | Suzuki et al. | 718/104 |
| 2010/0115527 A1* | 5/2010 | Kotlyar et al. | 718/104 |
| 2010/0153965 A1* | 6/2010 | Arimilli et al. | 718/105 |
| 2010/0238796 A1* | 9/2010 | Supalov | 370/225 |
| 2010/0246665 A1* | 9/2010 | Brederson et al. | 375/240.01 |
| 2010/0251259 A1* | 9/2010 | Howard | 718/105 |
| 2010/0274549 A1* | 10/2010 | Tal et al. | 703/17 |
| 2010/0333074 A1* | 12/2010 | Supalov et al. | 717/136 |
| 2011/0067016 A1* | 3/2011 | Mizrachi et al. | 717/149 |
| 2011/0093854 A1* | 4/2011 | Blanc et al. | 718/101 |
| 2011/0161943 A1* | 6/2011 | Bellows et al. | 717/149 |
| 2011/0161976 A1* | 6/2011 | Alexander et al. | 718/104 |
| 2011/0302587 A1* | 12/2011 | Nishikawa et al. | 718/103 |
| 2012/0110586 A1* | 5/2012 | Coon et al. | 718/102 |

FOREIGN PATENT DOCUMENTS

| | | |
|---|---|---|
| WO | 01/04770 A2 | 1/2001 |
| WO | 2008/054740 A1 | 5/2008 |

OTHER PUBLICATIONS

Zoraja et al., "Resource Management in Message Passing Environments," *Journal of Computing and Information Technology—CIT* 9:43-54, Jan. 1, 2000.

International Search Report mailed Nov. 25, 2010, for PCTAN PCT/EP2010/004564, 4 pages.

Written Opinion of the International Searching Authority for PCTAN PCT/EP2010/004564, 6 pages.

* cited by examiner

GROUPING AND PARALLEL EXECUTION OF TASKS BASED ON FUNCTIONAL DEPENDENCIES AND IMMEDIATE TRANSMISSION OF DATA RESULTS UPON AVAILABILITY

CROSS-REFERENCE TO RELATED APPLICATIONS

This application is a U.S. national stage application filed under 35 U.S.C. §371 of International Patent Application PCT/EP2010/004564, accorded an international filing date of Jul. 26, 2010.

The present invention relates to computing systems. More specifically, the present invention relates to methods and systems for organizing computations of an application to be performed in parallel.

Historically, software programming has been linked to a principal system architecture called "Von Neumann architecture", which is characterized by one execution unit and one storage for all of data and program code. The single storage is organized as a "shared memory", that is a uniform memory space with a single, uniform address.

"Software programs" in a historic sense are sequential sets of
{get next command from memory
get required data from memory
execute, compute
store result in memory
} repeat The specialization or "cleverness" of a program has entirely been in the commands, the order of commands and organization of data into structures in memory. Execution speed has been determined by the physical speed of the execution unit, indicated by the frequency of the CPU (central processing unit), measured in Megahertz (MHz). The execution speed is further determined by memory and bus latency (for instance, DDRx—"double data rate" memory). Besides the above identified hardware parameters, the execution speed is further determined by the cleverness of the sequential code (mainly avoiding unnecessary repetitions, clever search and look-up etc.).

Thus, the development of a computing environment has always to be considered in the framework of an optimal trade-off between hardware and software, as is illustrated in FIG. 1.

The main questions to be answered for implementing a particular problem include the questions of what type of hardware to use, and which functionality to implement by hardware and software, respectively.

For the last forty years the above paradigm has not stopped "Moore's Law". According to "Moore's Law", the doubling of all relevant compute parameters occurs every two years. Specifically, this concerns the speed of execution. Moore's Law is mainly due to the doubling of device speeds (from hundreds of Kilohertz (kHz) to about 3 GHz (Gigahertz), which corresponds to about fifteen times "doubling".

Due to the fact that device speed has hit physical limits (CPU have been maxed at about 3 GHz since about eight years ago, according to Moore's Law there should be 16 to 32 GHz CPU by now), effectively Moore's Law is no longer true, specifically for execution speed. On the other hand, density (the number of compute devices per unit area/price/hour) still follows Moore's Law nicely.

Since device speed has effectively hit a physical wall, although density and price have not, an increasing number systems have at least two CPUs, or even four to eight. Accordingly, there is a trend for implementing more CPUs rather than faster ones.

The fact that program and data reside in one shared memory has become the main limitation to Moore's Law. This phenomenon, also known as "Von Neumann Bottleneck", is illustrated in FIG. 2. As can be seen from FIG. 2, both the control unit controlling the program flow and the arithmetic logic unit (ALU) processing the data access the same "central" memory.

One parameter which has always kept up nicely with Moore's Law is memory size. For instance, a Sinclair Zx81 personal computer had 1024 bytes of memory in 1981. Today a typical laptop has one GB (gigabyte). This is equivalent to about 20 doublings in less than 30 years. Memory speed (access speed), on the other hand, has always significantly lagged behind CPU speed. If a modern CPU had to wait for the memory to deliverer the individually requested piece of data, it would be waiting for the memory for around 99% of the time, hence reducing the system speed by a factor of 100.

This has so far been mostly prevented with a technically rather ugly workaround: "Cache", a much smaller, very fast and expensive additional memory section (or in fact, several levels of them), located very close to the CPU (nowadays typically on the same chip). The usage of this memory is to transparently store a copy of the most frequently used data so that in case it is needed, the CPU does not have to wait for it to be retrieved from slow main memory. Similarly, when the CPU writes data, it is stored in the cache and only updated to main memory "occasionally".

In the case of several CPUs in a multiprocessor system updating main memory, this leads to the problem of "cache incoherency". Each CPU has a slightly different view of the main memory's state. The moment one CPU writes data, all others have an outdated view in their caches. In order to re-instate cache coherency, all CPU caches need to communicate with one another and update main memory frequently. This is most likely to lead to increased cache misses so that a needed data item is not available in a local cache. A consequence thereof is an increased waiting time for global memory. Since even the slightest increase in waiting leads to severe degradation of performance, as pointed out above, in many cases a system with more CPUs is actually slower than if restricted to one single CPU. This fact is known as the "memory wall". A "brute force" approach of enhancing the amount of cache gives only a diminishing return.

The memory wall can only be overcome by having independent processes, which are known not to rely on overlapping data. In other words, independent processes are those that have their own data to work on. For random different tasks in a computer (for instance, email, streaming music, word processing, webcam etc.), this is most likely to be the case naturally and hence a computer with multiple CPU can be used reasonably efficiently for these tasks (apart from the fact that typically even a single modern CPU is completely sufficient for doing all these not so complex tasks simultaneously).

It is a drawback of the conventional approach described above that it is not applicable to the case when a single application needs more speed.

The present invention aims to provide systems and methods for efficiently organizing parallel processing within a single application running on a computing system and for an efficient implementation-independent simulation thereof.

This is achieved by the features of the independent claims.

It is the particular approach of the present invention to decompose an application into multiple tasks that are independent of each other to a high degree. This is achieved by utilizing knowledge about functional dependencies between tasks and the respectively necessary communication. The tasks can thus be scheduled to be performed in parallel on a multi-processor computing system. On the CPU level, non-preemptive multitasking is applied. Since the tasks of a single application are never completely independent, communication between the tasks is organized by means of an explicit direct communication ("handshaking"), which overcomes the "memory wall".

According to a first aspect of the present invention, a distributed scheduling system for a computing system including plural processing units for parallel processing of tasks is provided. The scheduling system comprises a grouping means for grouping a plurality of tasks belonging to one application into a plurality of task groups by taking into account application-specific functional dependencies between individual tasks and the resulting communication processes between the individual tasks. The distributed scheduling system further comprises a first scheduler operating at the computing system level, for scheduling the task groups together with other system functions not belonging to said one application over the plurality of processing units. The scheduling is performed such that a single one of the task groups becomes assigned to an individual one of the processing units. The scheduling system further comprises a plurality of second schedulers at the processing unit level for scheduling the tasks of each of the task groups assigned to an individual processing unit according to a non-preemptive multitasking scheme.

According to a second aspect of the invention, a computer-implemented design process for an application including a plurality of tasks to be performed on a computing system comprising plural processing units is provided. The design process enables parallel processing of tasks belonging to the application. The process comprises the step of grouping the plurality of tasks belonging to the application into a plurality of task groups by taking into account application-specific functional dependencies between individual tasks and the resulting communication processes between the individual tasks. The process further comprises the step of scheduling at the computing system level, the task groups together with other system functions not belonging to the application over the plurality of processing units. Scheduling is performed such that a single one of the task groups becomes assigned to an individual one of the processing units. The process further comprises the step of scheduling the tasks of the task group at the single processing unit according to a non-preemptive multitasking scheme.

According to a third aspect of the invention, a method of executing an application including a plurality of tasks on a computing system comprising plural processing units, by means of parallel processing of tasks belonging to the application is provided. The method comprises the step of grouping the plurality of tasks belonging to the application into a plurality of task groups by taking into account application-specific functional dependencies between individual tasks and the resulting communication processes between the individual tasks. The method further comprises the step of scheduling, at the computing system level the task groups together with other system functions not belonging to the application over the plurality of processing units, such that a single one of the task groups becomes assigned to an individual one of the processing units. Further, the method comprises the step of scheduling the tasks of the task group at the single processing unit according to a non-preemptive multitasking scheme.

The scheduling at the computing system level may be performed according to a preemptive multitasking scheme. However, also a co-operative scheduling is alternatively possible at the computing system level (operating system level). The operating system may be instructed to schedule processes belonging to functions that are separate from the application on other processing units than those occupied by the task groups of the application.

Preferably, the distributed scheduling system forms a part of the computing system. Examples of a computing system according to the present invention include but are not limited to computers having multiple CPUs (Central Processing Units), multiple GPUs (Graphics Processing Units) or computers having both multiple CPUs and GPUs. Such computers may be implemented in a variety of electronic devices (sometimes called "gadgets") having multiple processors. Non-limiting examples are multi-CPU mobile phones, video cameras, and distributed processing components of vehicles, preferably also including vehicle entertainment and information systems. Further, the computing system according to the present invention may comprise plural computers, each having one of multiple processing units.

Also preferably, a communication between tasks is scheduled by the distributed scheduling system. Direct communication between a first task that is performed at first processing unit and a second task that is performed at a second processing unit means that all data resulting from the first task that have to be used by the second task are transmitted via a data communication channel together to a local memory and/or to the cache at the second processing unit, as soon as the data are available in a local memory unit and/or cache of the first processing unit. By implementing direct communication between tasks, the "memory wall"—problem is avoided. The data are received "just in time" by the processing unit where the data is needed.

Further preferably, the distributed scheduling system schedules the second task to begin as soon as the data has been transmitted. By not scheduling the task before the data has been made available and transmitted, it is avoided that the task is running idle due to a lack of data, and processing time is blocked. To the contrary, as long as the data required by the second task is not available, another task of the same task group scheduled at the second processing unit can run, which is independent of the respective data to be provided from the first processing unit.

Preferably, the data communication channel is implemented by means of a communication FIFO. The communication FIFO may be implemented as a portion of shared memory. According to a preferred embodiment, the local scheduler of the second processing unit polls the communication FIFO for newly written data items to be loaded into the local memory and/or cache.

Alternatively preferably, the local scheduler of the first processing unit issues a signal indicating to the receiver that newly written data is available in the Communication FIFO to be loaded into the local memory and/or cache at the receiving processing unit.

Preferably, the transmitted data are pre-fetched into the local cache of the second processing unit. Alternatively, preferably, the transmitted data is copied into the local memory unit at the second processing unit. It is advantageous to pre-fetch the data into the local cache, since the data are made available to the second processing unit as quickly as possible. On the other hand, it may occur that the cache is filled with data that are currently unnecessary, if the previous task has not yet been finished by the second processing unit. This can be avoided by the alternative of copying the data into the local memory unit, which however increases time required for loading the data out of the local memory into the cache at a later stage.

Preferably, the data items include a communication header indicating a current access status of the data items. The data header is employed to ensure that only a single processing thread accesses a particular data item at any point in time.

Preferably, plural local memory units at plural processing units are organized as a shared memory. More preferably, plural processing units are organized as a NUMA (Non-Uniform Memory Architecture) node.

According to a further aspect of the present invention, a computer program product is provided. The computer program product comprises computer-executable code for performing an application designed by design process according to the second aspect. Preferably, the computer program product is used for simulating the executing of an application on an execution platform. Necessary processing time for simulating the execution on several potential execution platforms and designing an optimal execution platform for implementation can be decreased since the simulation takes into account the knowledge about functional dependencies and organizing direct communication in accordance therewith for simulation. The simulation according to the present invention is language agnostic.

It is noted that it is not the intention of the invention to accelerate separate independent applications. However, their effect on the application to be designed can be studied using the simulation according to the invention.

A further aspect of the present invention provides a computer-readable medium having recorded thereon a computer program product according to the previous aspect of the invention.

According to a further aspect of the invention, a computer-implemented process of simulating an executing method according to the third aspect of the invention is provided. Since the invention enables to parallelize the simulation itself, the simulation is considerably accelerated.

Preferably, the methods according to the aspects of the present invention are applied to massive parallel computing. In particular, graphics cards are used with many hundreds to many thousands of processors (GPU). A specific procedure of handshake is employed between processes running on graphics cards and CPUs.

A particular, non-limiting field for applying the invention is video processing, including encoding and decoding. For instance, while a particular frame is encoded, data for a subsequent frame can be read. To a certain extent, also frame encoding itself can be parallelized. Also, in an encoder, encoding and decoding processes can be performed in parallel. In particular, the invention may be applied to video decoding and encoding in compliance with the H.264 standard.

Further preferably, the methods according to the present invention are applied to computing on multiple computers. These computers are preferably connected by networks (for instance, LAN) for communications. Further preferably, all aspects of the present invention are combined in a complete, coherent system.

Further features and advantages of the present invention are the subject matter of dependent claims.

Additional features and advantages of the present invention will become apparent from the following and more particular description, as illustrated in the accompanying drawings, wherein.

Figure 5:
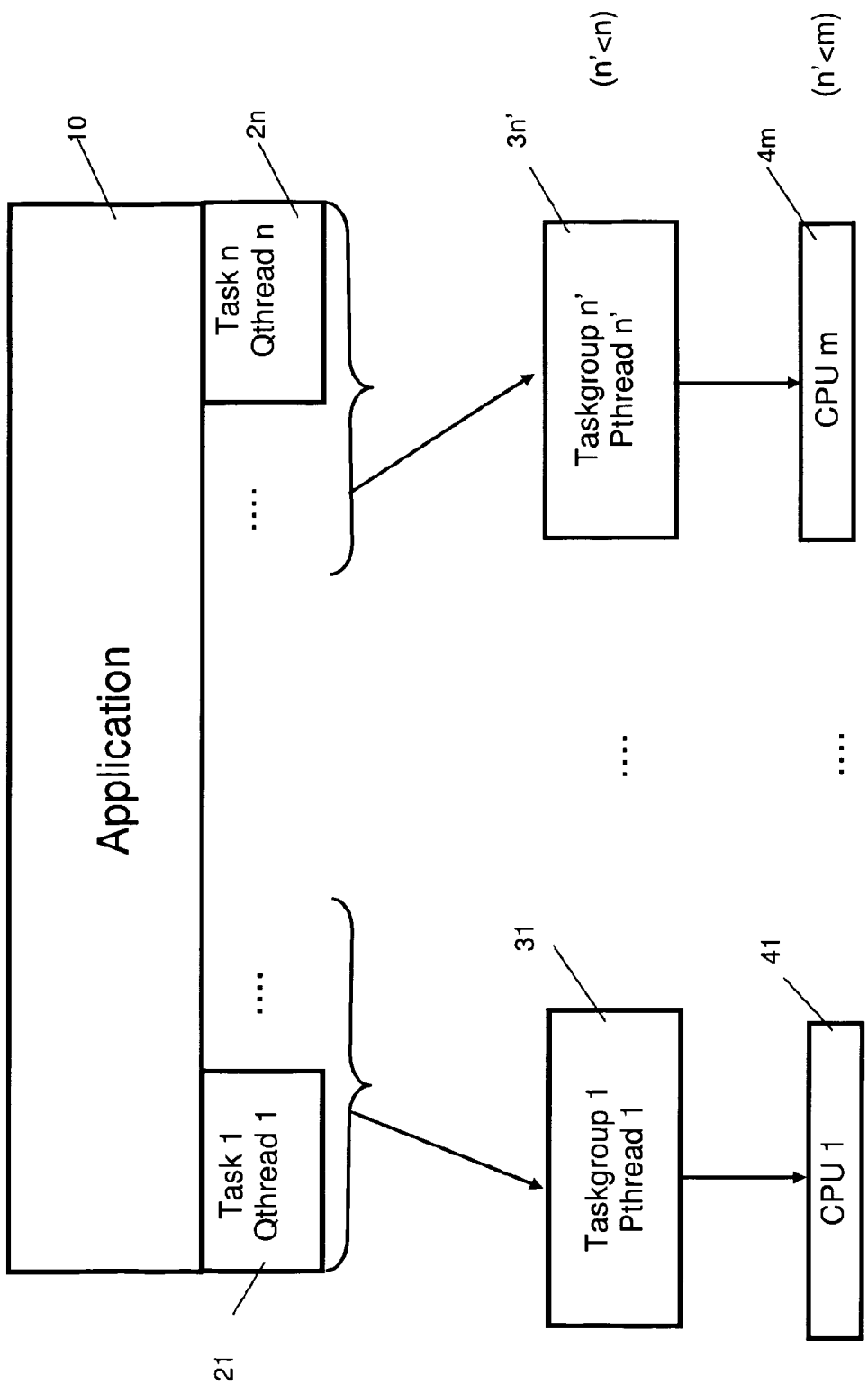
Figure 6:
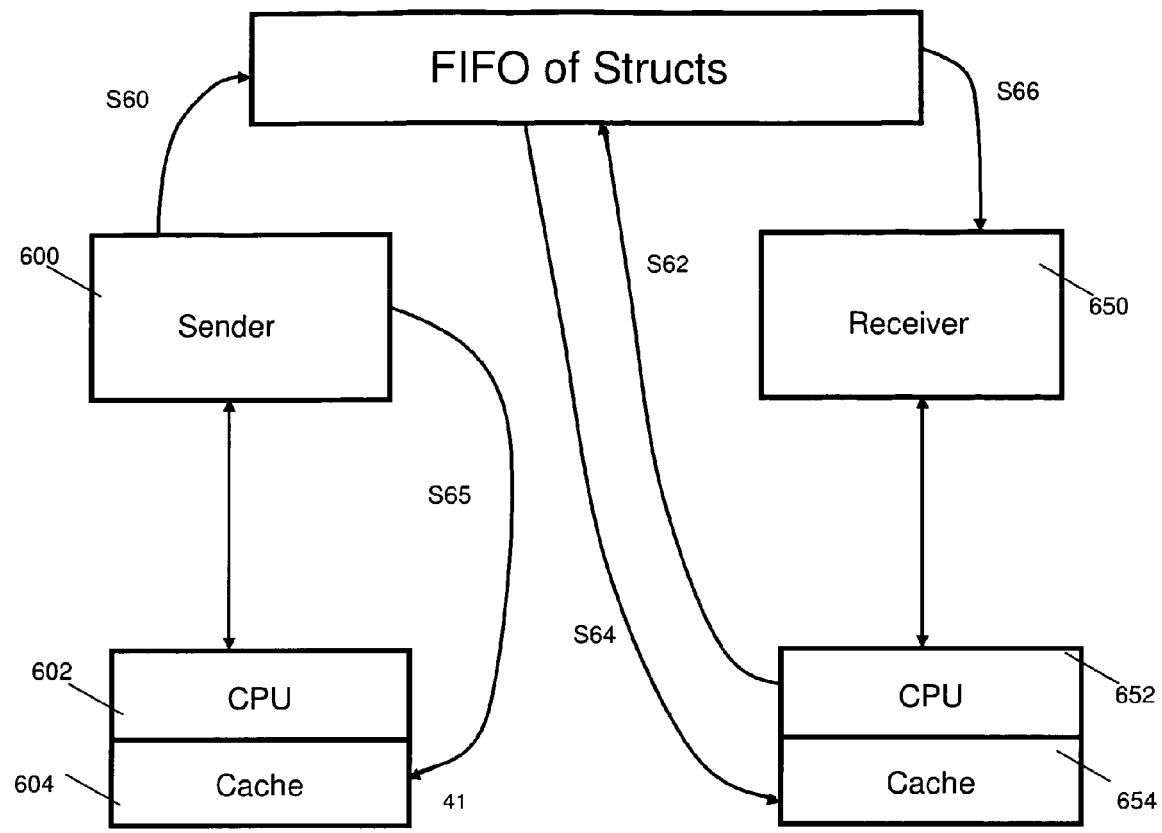
Figure 7:
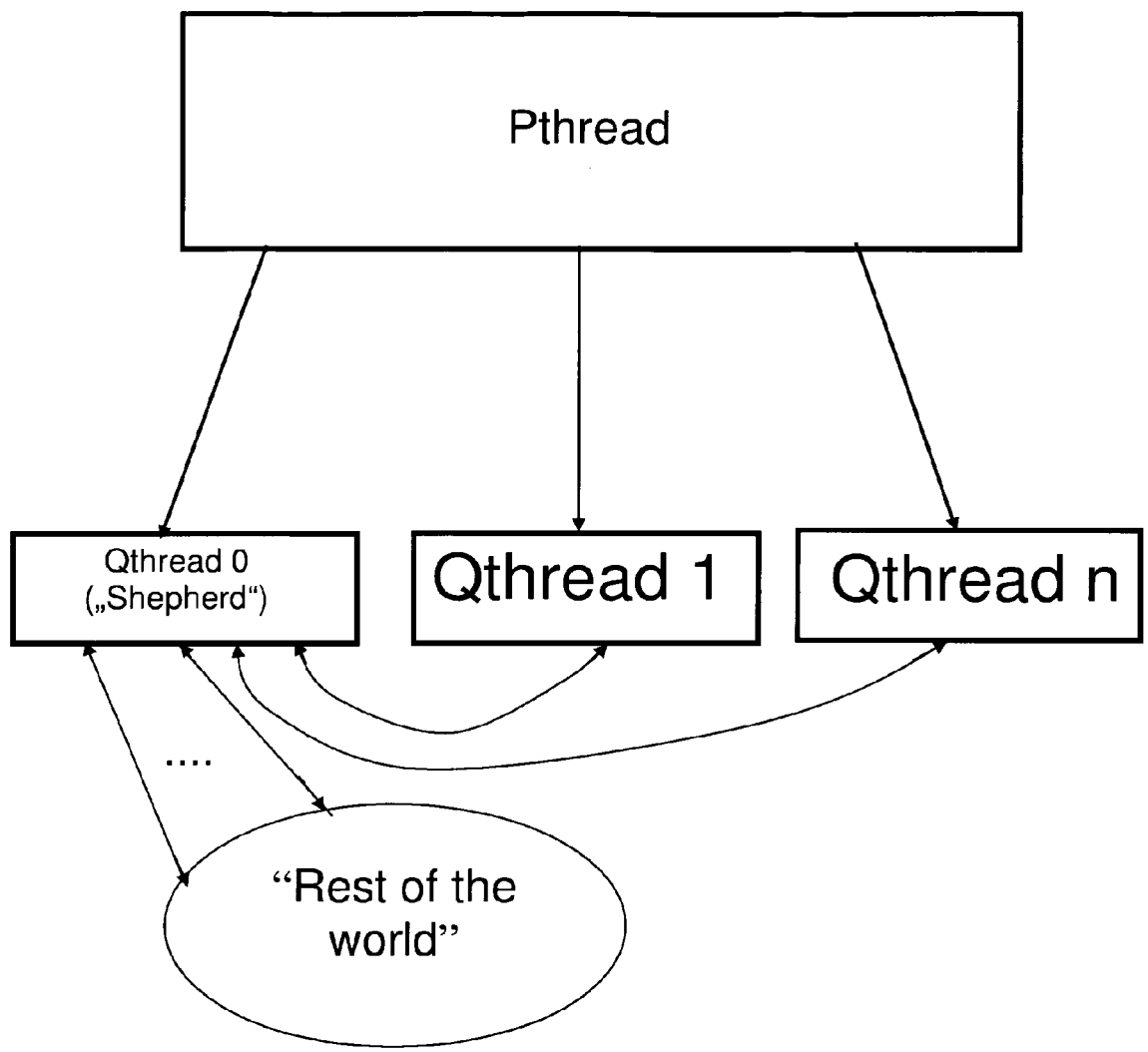

FIG. 5 schematically illustrates the composition and scheduling of an application in accordance with the present invention;

FIG. 6 illustrates a communication method according to an embodiment of the present invention; and FIG. 7 provides a schematic illustration of communication of tasks inside and between groups of tasks.

Illustrative embodiments of the present invention will now be described with reference to the drawings.

Figure 1:
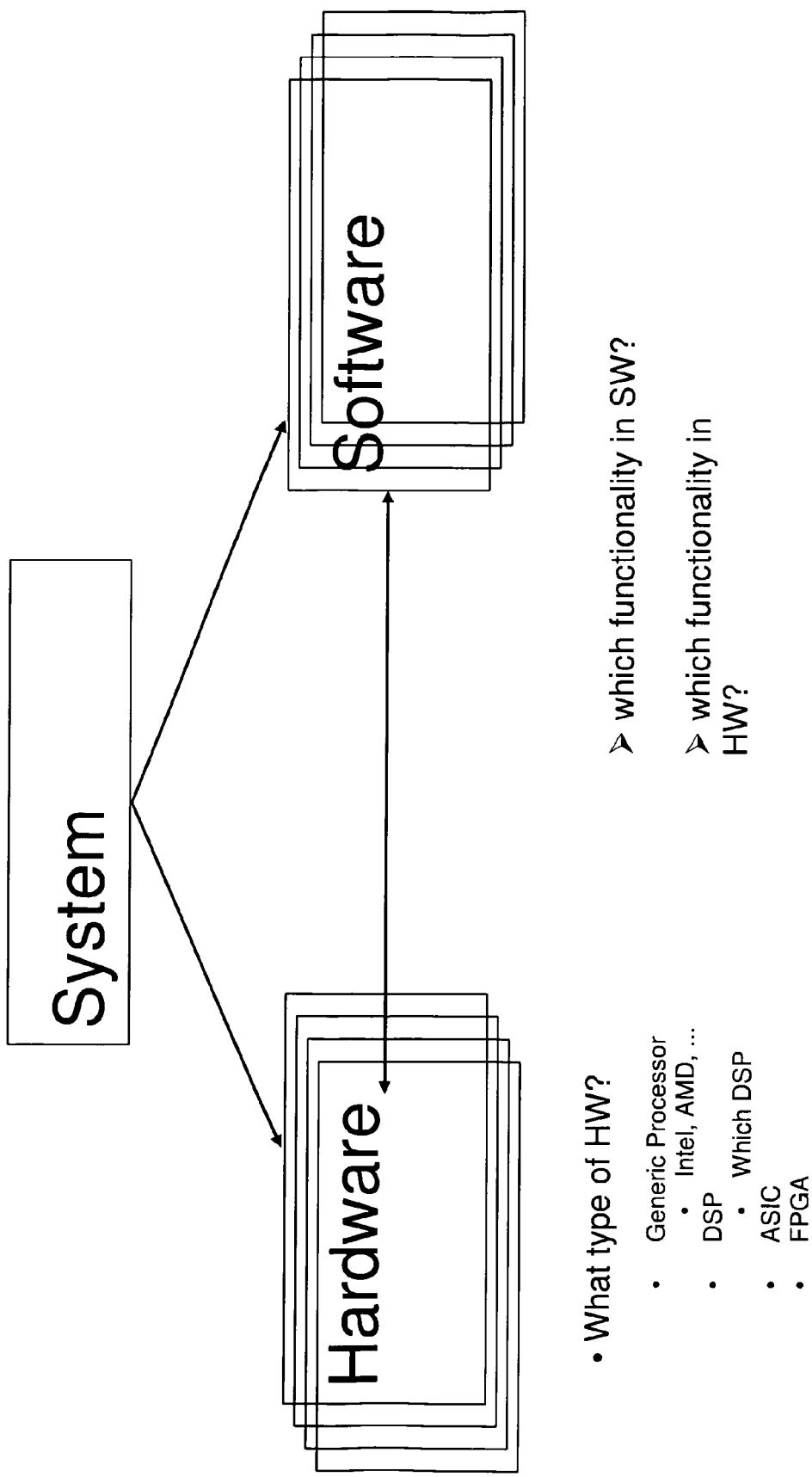
FIG. 1 is a schematic illustration of the idea of a trade-off between hardware and software in development of an electronic system.
Figure 2:
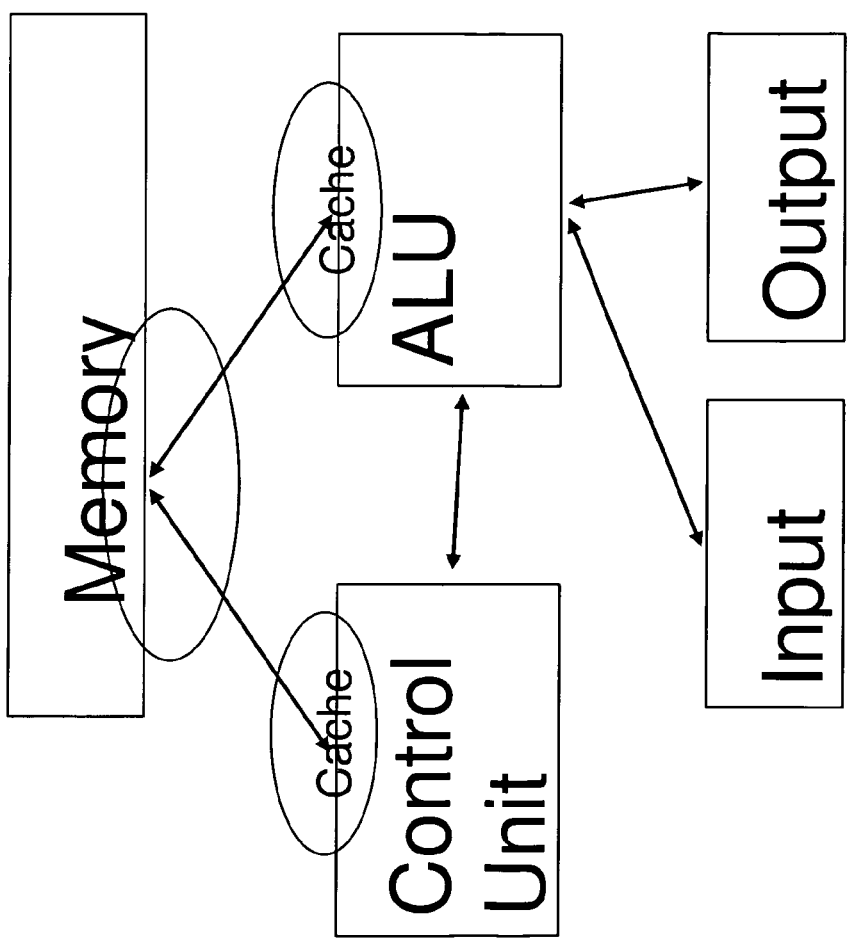
FIG. 2 is an illustration of the limitations occurring in conventional computing systems.
Figure 3:
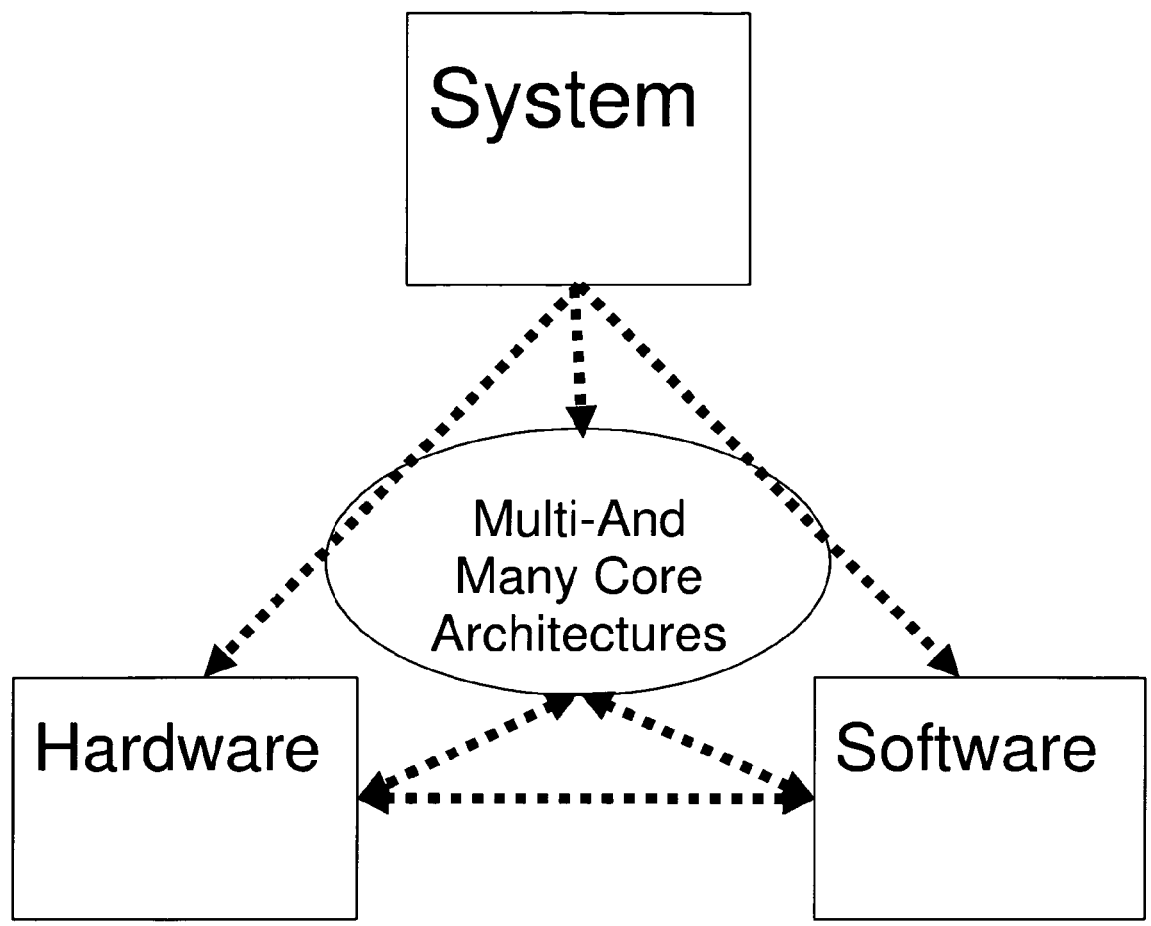
FIG. 3 is a general schematic illustration of the overall system architecture employed in the present invention.

The overall system architecture employed in the present invention is schematically illustrated in FIG. 3.

The present invention relates to overcoming problems such as cache coherency and memory wall conventionally preventing parallelization in processing a single application for speeding up. The application is therefore decomposed in as many and as independent tasks as possible. These are obviously never completely independent (otherwise they would not usefully describe a single application), so there needs to be communication between these tasks. If the communication causes individual tasks to wait for one another, the speed gain from multiple computing resources will very quickly be used up by waiting. This is a consequence of Amdahl's Law, according to which the theoretical maximum speed up of a program using multiple processors is limited by the sequential fraction of the program, i.e. the portion of the program that cannot be parallelized. For example, if 95% of the program can be parallelized, the theoretical maximum speed up using parallel computing would be twenty times, no matter how many processors are used.

Traditionally, in a standard computer system, the only way for separate tasks to communicate with each other is through shared memory, which if not done very carefully and explicitly will obviously also trigger the "memory wall". According to the present invention, therefore a particular direct and explicit communication method will be used, as described in detail below.

Figure 4:
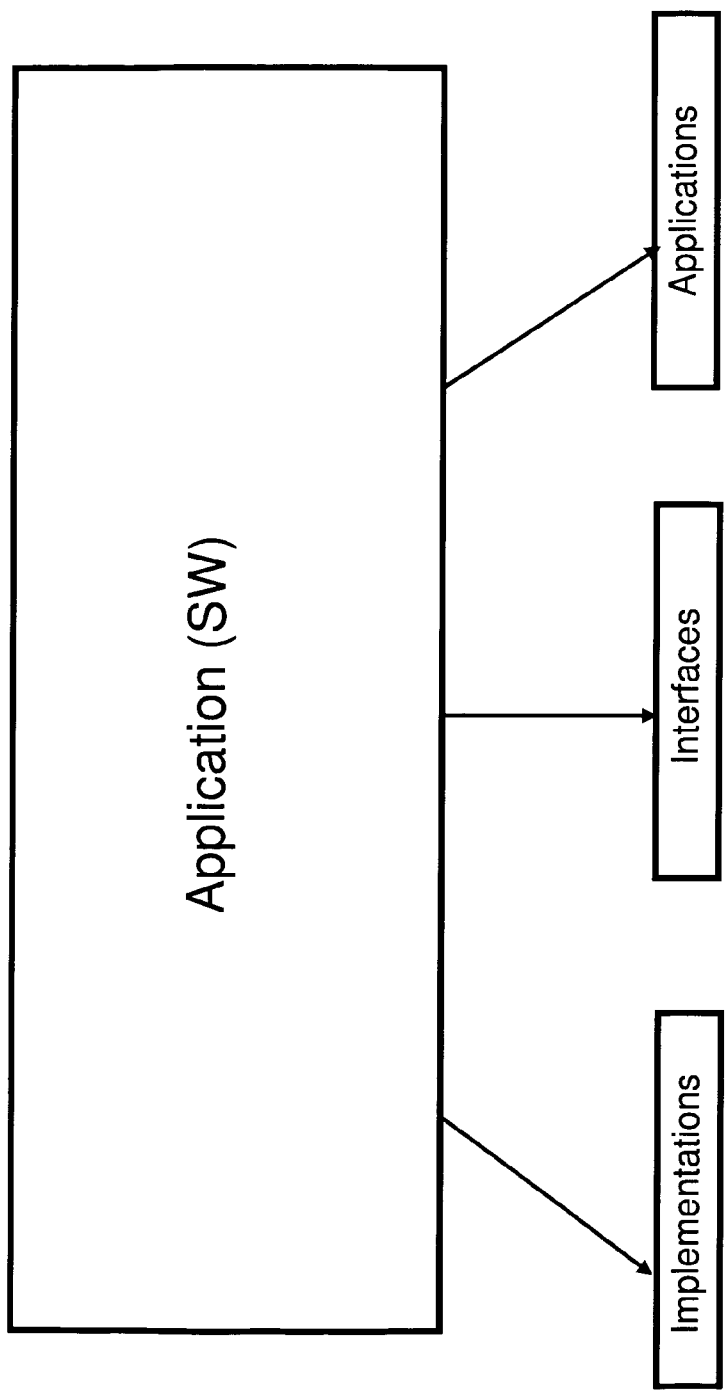
FIG. 4 is an overall scheme of the architecture of a software application in accordance with embodiments of the present invention.

The decomposition (partitioning) of an application into independent tasks is generally illustrated in FIG. 4. The application is partitioned into tasks that are grouped into task groups. Those groups are then assigned quasi-statically to execution units (for example individual CPU, GPU, hardware resources, computers in a network) and execution is scheduled on those resources according to system wide knowledge of the communication and the need and priority based on the availability of data.

As can be seen from FIG. 4, the top application is hierarchically decomposed into interfaces, implementations and applications. Lower hierarchy applications illustrated on the right hand side of FIG. 4 can be further decomposed in the same manner. The particular combination of particular interfaces, implementations and applications is called a "module". Decomposition/partitioning is performed using combinations of hardware and software design techniques and methods.

The decomposed structure of interfaces, implementations and applications is similar to the structure of VHDL (Very High Speed Integrated Circuit Hardware Description Language), having entities, architectures and configurations.

The interfaces define inputs and outputs of an application module, but they do not define any implementation details.

An example of an interface is sin x, which is a function having one (double precision) input and one (double precision) output.

Implementations provide behavioural or structural descriptions of the functionality of a module. An example of a behavioural implementation of sin x is a C++ implementation of the sine function using a Taylor series algorithm.

A structural implementation itself contains modules, which together would make up the desired function by performing sub-functions and communicating with each other. An example would be one sub-module for each term of the Taylor series and a summation module adding the outputs of each Taylor term. The connection of several modules using "nets" (connections carrying data or communication, or simply electrical current) in hardware design is called "netlist".

A partly structural and partly behavioural example would be the invocation of a library element which maps the computation to a graphics card GPU.

A structural or hierarchical implementation of a module provides a description of a module in terms of other interfaces. An example of a structural implementation of f(x)=k*x+b is a hierarchical netlist instantiating one adder and one multiplier, and connecting them in such a way to implement the linear transformation.

It has to be noted that a structural implementation refers to interfaces such as multiplier and adder, but not to implementations. In other words, the structural implementation refers to an abstraction of "multiplier" etc., and defines the number and type of required interfaces (for instance, two inputs, one output for the result), but it does not define the implementation such as behavioural, structural etc. A module actually used in the netlist is called an "instance".

Similarly, an implementation alone does not specify a complete application. In order to build the entire application for each of the instances, a specific implementation should be chosen. For instance, in the above example, it should be specified which multiplier implementation and which adder implementation should be selected for each of the instances in order to actually execute the application.

The decomposition of an application into implementations, interfaces and lower level applications allows system level architecture exploration. The solution space is spanned by interfaces having multiple implementations. Some of the implementations are hierarchical (structural) and some are behavioural. The problem of system design is the generation of a complete application satisfying given precision, performance and resource usage criteria.

A method and apparatus according to the present invention allows the design of an application in an abstract fashion using the constructs mentioned above. The platform and implementation specific details are designed and kept separately.

For execution and performance evaluation (exploration), a method according to the present invention (preferably implemented in software) can dynamically combine the two "worlds" of abstract design and platform/implementation specific details. Such a dynamic combination is called "folding". By folding, the pure functional design is thus mapped on a particular execution platform. In other words, a function is executed as defined by the functional description (as a hierarchical, decomposed application). The specific requirements and constraints which are required by the platform and implementation choice are handled separately.

This can happen either in pure software (called "exploration by folding") or in actual implementation, as a potentially finished product (called a "mapped design"). An example of the latter case is a fast, parallel implementation running on two computers with eight CPUs and 4 GPUs (graphics processing units).

In the case of designing M applications and N platforms, there results an M*N solution space, which can be explored. Actually for a given pair (A, P) of applications and platforms, there is often more than one possible folding. If K defines the average number of possible foldings, the overall number of possible solutions is M*N*K.

Furthermore, the above mentioned decomposition of applications into interface, implementation and application produces an even richer solution space. If the depth of the design tree is D and on average each hierarchical module has C instances and each behavioural module has L alternative implementations, then we have $L^{(C^D)}$ possible implementations for the given application. It has to be noted that not only leaf nodes but even higher hierarchy nodes of the application may have multiple implementations, further increasing the solution space.

The algorithms for automatic folding are similar in some ways to the algorithms used in traditional design applications known from logic synthesis and integrated place and root tools, as well as automatic floor planning. Examples of design rules are electronic design automation (EDA), in particular for application specific integrated circuits ASIC.

Once completed, however, a major portion of the work required to finish the product is done and the design can be implemented typically very quickly on the target platform, saving additional effort, time and cost. Thus, the folding method according to the present invention is advantageous since it enables a designer to achieve a better solution from a broader solution space at less expense.

Folding assigns tasks to "platform elements" (e.g CPU, GPU, computer in a network, hardware etc.). In the case, that this platform element actually exists ("real platform element"), the task is actually compiled for that platform—implying that a compiler and compilable description of the task for that element exists, and then loaded and physically run on that platform element. The invention may provide (generate, synthesize) the required communication infrastructure, scheduler, FIFOs etc. in order to enable this. This infrastructure will be part and significant for the executable actually representing the runnable software implementation of the system being designed.

On the other hand, the functional system description can also be simulated by means of the invention, which means that—while it is actually executed and performs its function in reality as described before—however, the individual tasks may be "assigned" to existing or non-existing "virtual" "platform elements" (e.g. CPU, memory, GPU, computers etc.). In the case, they are assigned ("folded") to a virtual element, the task is actually executed on another real existing element as described above, but execution attributes for the simulation (e.g. timing behavior, energy consumption other cost functions per transaction) are taken from "characterization tables". This allows to evaluate hypothetical performance of a system on other hardware platforms as well as allow identification of bottlenecks in the system before actually having to design particular design steps to address them. A person skilled in the art is aware that this allows a more efficient and intelligent partitioning and assignment to existing platforms (e.g. multiple CPU, GPU) as well as determining if other platform elements should be acquired or designed in order to eliminate bottlenecks. For example, it can be determined if more CPU's than actually available would be beneficial for system speed before actually acquiring additional hardware.

Above mentioned simulation capability's existence is one aspect of the present invention as it leads to an efficiency of parallel implementation, usage of parallel hardware and efficient matching of available hardware with parallel implementations that could not be obtained conventionally.

Once the desired match of parallel implementation and parallel hardware is determined, the necessary hardware needs to be acquired (or designed and built) and the tasks need to potentially be re-written for the target platform architecture (e.g. GPU implementation). Then the task is actually mapped onto the attached platform element and the necessary communication is provided.

The task scheduling scheme according to the present invention will now be described with reference to FIG. 5.

Generally, a system such as an application consists of many tasks, which can in principle run in parallel. For example, there can be many more tasks than there are physical CPUs available in the computer system used to run the execution. In this case, several tasks have to share a common CPU and can therefore no longer actually run in parallel. Examples of "tasks" are, for instance, "processes" or "threads".

In accordance therewith, the tasks have to be scheduled (distributed) over the physically available processing units (CPUs, GPUs): multitasking. Generally, two types of multitasking systems are known in the art: non-preemptive (also called cooperative or collaborative multitasking) and preemptive multitasking.

In non-preemptive multitasking, a particular task maintains control over the processor, as long as the task has not been completely finished. Thus a switchover from one task to the next is performed by the active task itself, by jumping to the operating system and thus releasing the processor. In other words, each task runs for as long as it needs to finish a single transaction and hands over control (cooperatively) to the scheduler when done.

It is a drawback of non-preemptive multitasking that a single task can block the whole system when it is "hanging", and thus does not return to the operation system.

In preemptive multitasking, the operating system (kernel scheduler) lets a task run for a certain time, and then stops it and runs another task, and then another one and so on. In other words, in preemptive multitasking the operating system assigns the calculation time for each task. Each task is assigned to the CPU only for a predetermined time, called time slice or "tick". Switchover from one task to another is performed independently from the current activity of the active task. Thus a task may need several ticks to be finished. If a task is finished before the tick ends, immediate switchover is performed towards the next task, thus receiving the remaining duration of the tick. In any case, a switchover to the next task is always performed at the end of a tick. A single task cannot block the whole system in preemptive multitasking since the tasks which switchover is performed automatically by the scheduler of the operating system.

It is however a drawback of preemptive multitasking that the availability of an output of a particular task may be delayed, since the task is automatically interrupted by the scheduler although it is not finished.

Preemptive multitasking is a normal operating practice in UNIX based systems. Employing preemptive multitasking in a computer system with a fast CPU leads to the appearance of the computer performing several tasks concurrently (for instance, playing music while the user is reading emails), whereas in fact they are not running concurrently, but are simply switched back and forth very quickly.

In view of the particular characteristics and drawbacks of the above described preemptive and non-preemptive multitasking schemes, it is the particular approach of the present invention to combine both schemes of scheduling in a hierarchical manner. A scheduling according to the present invention is therefore organized into several levels. The first level corresponds to a single CPU. The highest level is the overall system level. Further, there may be intermediate levels such as a NUMA node.

NUMA means "Non-Uniform Memory Architecture". NUMA is an architecture for multiprocessor systems, wherein each processor has his own, local memory. However, other processors can access the local memory since all local memory units share a common address space (Distributed Shared Memory). Memory access times depend on whether a memory address refers to the local or a remote memory unit.

On an NUMA node, there are four, or in recent embodiments six, physical CPUs sharing a distributed memory having a joint address space. Thus, memory access is parallelized by localization. Thereby, efficient parallel computing on multiple cores is enabled. Each compute node has direct and fast access to local memory. A new computing paradigm combining NUMA and parallel computing with explicit communication between processes is of particular importance in the framework of Transaction Level Modeling (TLM, see below).

According to the present invention, preemptive multitasking is not used on the first level, for in-CPU scheduling.

Instead, at any time only a single thread or process is assigned to an individual CPU. A single thread is called a "pthread" (posix thread). "Posix" means "portable operating system interface" (originally for UNIX), and is the name of a family of related standards specified by the IEEE as an interface between application and operating system. The pthread contains all tasks assigned to the particular CPU. Thus, more generally speaking, a pthread corresponds to a group of tasks such as task group 1 (31) of FIG. 5, which comprises plural tasks (21 . . . ) of FIG. 5. All tasks contained in the task group are assigned to the same CPU, but not in a fashion which is seen/scheduled by the operating systems kernel scheduler (which employs preemptive multitasking, as will be described below). The number of task groups (n) should therefore be defined so as to be smaller than the number of processing units (n').

An individual CPU can only perform a single processing at a time. The single pthread invokes plural qthreads ("quick threads"). As can be seen from FIG. 5, one "quick thread" is used per task and an individual CPU-based scheduler (proprietary scheduler) is used to schedule these quick threads. There are two main reasons for this: firstly, the load of the operating system scheduler is reduced since the overall number of tasks (threads) is potentially very large. Secondly, the introduction of an individual per CPU scheduler allows the use of co-operative (non-preemptive) multitasking at the CPU level.

This means that each qthread (each task, for instance representing a single executional module) runs for as long as it needs in order to complete an individual task. In particular, the task corresponds to a transaction in the "TLM world". TLM stands for "Transaction Level Modeling" and enables a technology-independent hierarchical to down design simulation scheme providing always the right level of abstraction.

After the single transaction has been finished, control is cooperatively handed off to the individual scheduler. In a parallel processing system, it would make no sense to start a task but interrupt it before it has been finished and has produced and posted its result, since more tasks running in parallel on different processing units wait for the results. Thus when employing a preemptive multitasking scheme on the lowest hierarchical level, a waste of execution time would be the consequence.

Based on information regarding the output results of individual tasks, the individual scheduler can make a decision about which task to run next. A decision can be made, for example, based on priority, when a task has more elements waiting on its input buffers or when lots of tasks are waiting idly for data from a particular task. Specifically important is of course the case when tasks of another CPU are waiting for data and the other CPU is actually idle because of a lack of the data (wasting execution time).

In addition to priority, the invention therefore applies the concept of urgency. Even a low-priority task can be urgent in case a priority task depends on its results or the overall system execution is waiting for data from the task.

In addition to the above described two main reasons, the individual scheduling on CPU level enables to "softly" control the fill level of input buffers/queues by scheduling modules which remove/add items to the queues to run. This is advantageous because a hard limit for buffer sizes is ruled out by the Kahn process theory. However, a truly infinite buffer size is obviously not practical or even useful.

On the one hand, at the operating system level, preemptive multitasking is employed. Thus the cooperative (non-preemptive) scheduling at the CPU level for the tasks assigned to each individual CPU is in contrast to a second level of multitasking. The upper level, is the regular kernel and operating system level and concerns the above mentioned task groups (multi-qthread tasks) themselves alongside all other functions such as global communication, scheduling, housekeeping etc. Although the system wide scheduler generally operates pre-emptively, it is preferably even avoided to pre-emptively schedule processes on processing units, whereon the task groups of the application are run. The operating system therefore blocks those processing units, whereon the task groups run, for the other functions to be scheduled, and schedules those other functions (preemptively) on other processing units not occupied by the tasks of the application.

On the other hand, system blocking due to hanging threads is avoided in the hierarchical scheduling according to the present invention. For example, since each module executes user-code directly, which in a debugging environment can contain bugs, they are potentially unreliable. In order to achieve overall system stability even in the presence of user bugs such as infinite loop, which could cause all tasks on a single CPU to "hang", since the system overall uses preemptive multitasking, the offending code section can be stopped (killed) and moved to a debugger, thereby helping the user to identify and fix the problems.

As explained above, for applying parallel computing to a single application, it is indispensible that individual tasks running on different computers communicate with each other. In order to overcome the bottleneck due to the memory wall effect, a particular explicit communication scheme is used as a "handshake" between communicating tasks.

Conventionally, tasks may be started (loaded into CPU by lengthy task switching) just to find out that they actually have no data to work on. In case they do have data, that data might still be stuck on the sending side (other CPU, computer etc.) or the cache is cold—meaning the data has to be retrieved from slow main memory. In case of NUMA style distributed main memory, the data might physically be located on another node exacerbating the delay before it can actually be used by the local task and making the actual transfer (which in any case has to be a complete, physical copy despite the fact that the NUMA memory management makes it seem like all it takes is a pointer move). This is potentially done very inefficiently by copying small items at a time as needed, incurring additional delays each time a new item is requested and adding unnecessary system load by transferring many, small, high-overhead data packets.

According to embodiments of the invention, the communication is made explicit. The designer enables the design scheme and simulator to "know" about the communication needs of the application to be designed by explicitly defining "ports" and connecting those through channels. This system combined with a capability to synthesize communication logic (FIFO, scheduler, communication devices like memory copy, sockets etc.) enables efficient, just-in time, urgency, priority and actual system load-aware communication. For example, in above NUMA example, instead of haphazard piece-wise sending of data as requested by the receiving node, communication is initiated by the scheduler resident in the sending node, aware of system state, priorities and urgencies and will send one (or few, depending on size constraints) large packet over the communication link and communicating that fact to the scheduler in charge of the receiving node. The receiving local scheduler will then (again depending on urgencies and priorities) initiate cache pre-fetches and finally launch the receiving task only once it has all required data in its local cache. Without explicit knowledge of the communication schemes, this level of efficiency is unlikely to be obtained by standard design paradigms conventionally known.

Instead of simply storing and retrieving data to and from shared memory, the present invention uses explicit communication between tasks. Logically, this means that one task (originator or sender 600) sends data through a communication channel 620 to a receiver 650 independent of any implementation or platform whereon it is eventually executed. The actual platform and respective implementation determine the type of handshaking (in other words, the actual means of communication).

Communication performed logically between tasks which are assigned to compute nodes accessing joint shared memory is actually implemented by passing pointers to FIFO structures between those tasks, pre-fetching data into cache of CPU's chartered with running tasks sinking or targeted by that communication and finally executing said task (now with "hot cache"). This scheme enables that—if necessary due to urgency—the target task will be executed with the minimum physically possible delay after the sending task has posted the result—guaranteed by the fact the distributed scheduler is aware of the explicit communication, the urgency constraint, the physical (e.g. cache scenario) situation and the actual timing and run-state of the involved tasks as well as physical resource load. A conventional scheduling concept is ignorant of most of those and therefore will make random and hence typically suboptimal scheduling decisions.

In the case of tasks communication with each other while being placed on compute elements not connected through shared memory (e.g. GPU with it's own global and local memory structures, NUMA architectures with distributed memory, separate computers with completely independent memory), the distributed scheduler according to the invention will facilitate explicit, offline (un-noticed by the functional tasks) data copying between the physical devices, communicate the state of that communication between the (distributed) schedulers on the local devices and hence enable the same level of directed, explicit, knowledgeable communication and scheduling as in the above, local case. Again in this case, the delay is guaranteed to be the minimum physically caused delay brought about by the necessity to communicate between physically separate devices. Those physical necessary delays are the main target for the above mentioned simulation capability of the invention in order to optimize distributing the system onto parallel platforms while staying within the given system constraints for timing, power consumption and other potential system constraints.

The above schemes may use if available or even synthesize if necessary some interaction with specific hardware (e.g. drivers of Ethernet interfaces, hardware FIFOs, cache line signalling used for pre-fetching state etc., e.g. to communicate with attached FPGA).

In order to interconnect various modules implemented in various platform nodes (fabrics) including processing units such as, FPGA (Field Programmable Gate Array) cards, GPGPU (general purpose GPU) cards, CPU/DSB (Digital Signal Processor) devices, ASIC fabrics, etc., according to the present invention, a series of interconnection nodes such as adaptors (transactors) between different fabrics is defined. Thereby, route traffic between modules is switched.

On a single computer with shared memory (ideally organized in NUMA as described above), the handshaking has after all to happen effectively through shared memory as there is no other physical way for tasks to directly communicate with each other. In order to avoid cache incoherency and the resulting memory wall, very explicit handshaking methods are applied.

As a communication channel described above, a FIFO 620 of "structs" is employed, to which the sender 600 can post additional entries (items of data) while the receiver 650 is working on retrieving the ones posted and handed over before. According to Kahn network theory, the depth of the FIFO is theoretically unlimited. The FIFO can be practically implemented as a portion of shared memory.

Each "struct" (data item) consists of a section for payload (the actual data being passed from sender 600 to receiver 650), and a state variable indicating the access status of the struct.

According to an embodiment of the present invention, the state variable can essentially hold the following values:
0: sender is writing, no access for receiver, only sender can update state
1: sender hands off to receiver, no access to payload for either sender or receiver, only receiver can update state,
2: receiver accesses (reads) payload, no access for sender, only receiver can update state
3: receiver hands off to sender, no access to payload for either sender or receiver, only sender can update state Another more sophisticated embodiment of state variable definition will be detailed below.

Physically, the actual memory for the state variables and the data payload will potentially be separated, because otherwise, each update of the state variable causes an invalidation of the entire struct which can potentially cause four times the communication overhead than if they are separated and the cache for the data section is only invalidated and updated once for each write of new data.

Each variable can be shared in an array/list for one entry towards the FIFO buffer and also shared between all channels between the respective compute nodes.

Besides the receiver thread (the pthread currently executed at the physical CPU), another pthread is running which acts as a pre-fetcher (amongst other tasks). Said second thread (process) pre-fetches the already posted items from the FIFO 620 into the cache 654 of the local CPU 652 before the real receiver 650 actually needs them. Such a communication is employed in case of different NUMA nodes for sender and receiver, so that sender and receiver correspond to physically separated local caches (604, 654).

Thus, the pre-fetcher makes sure that the data, which is being sent to a task on a different local NUMA node, is being copied to local memory and is additionally available in the L3 cache when the receiver 650 of the data (a task on a local CPU 652) needs it in order to start execution. More specifically, the communication procedure is as follows:

At step S60, sender 600 posts a data item to FIFO 620. Further, the sender writes the data item to local cache/memory 604 (Step S65). It is thereby implied that the memory is allocated on the local sender's node 602.

The pre-fetcher on the same CPU 652 as the receiver 650 for the data polls the communication FIFO of structs 620 for newly updated items (step S62). Alternatively, or even preferably, the pre-fetcher gets a signal from the scheduler indicating the availability of new data. Sequentially, the new data are loaded into local memory and cache in step S64.

Thus, once the receiver needs the data for processing, the new data item will already be cached and will not have to wait until the data is available from shared main memory in step S66.

In a perfect world (wherein the FIFO is effectively running filled with 2 to 3 items), the pre-fetcher will usually be waiting for the memory cache update of the next item to happen, while the actual receiver of an item will be busy working on the actual data. Once the receiver completes working on a data, control is briefly handed to the pre-fetcher, which "pre-anticipates" the next item.

The scheduler has to make sure that there are not too many items in the FIFO so that already pre-fetched items are kicked out of cache before the receiver uses them. This can be achieved by keeping a separate list of items and causing the pre-fetcher to occasionally repeat requests to those items in order to keep them in the cache. Once the receiver is done with the item, it gets removed from the list and hence kicked out from cache (unless the memory location gets updated with a new data item soon).

In the following, a further particular exemplary embodiment of the communication processing according to the invention will be described. The following description relates to communication between task groups (pthreads) running on a particular NUMA node.

Each task-execution pthread (which is logged to a specific CPU, as described above), includes, among others, a specific qthread, called "shepherd". In FIG. 7, the "shepherd" is shown on the left hand side of the drawing, labeled qthread0. The shepherd decides which new thread to run next and passes control to this next qthread, which, upon completion of its task, passes control back to the shepherd. Thus the shepherd acts as the local scheduler for scheduling the tasks at the CPU level, according to a non-preemptive multitasking scheme.

Therefore, the shepherd (local scheduler) maintains several lists:
a) A local runnable list. This list contains the threads (qthreads) which are ready to run and in addition, there is data about the priority of them.
b) A connections list. This list contains the net connections between threads (communication between tasks) and the status of those connections. This also includes priority and urgency information.

The pre-fetcher has access to the local shepherd's lists. Thus in the embodiment described, the pre-fetcher (an additional pthread as described above) is associated per NUMA node. The pre-fetcher in this embodiment is called a "Proximus daemon". The pre-fetcher updates the lists of the local shepherds as new data comes in from "outside" the NUMA node and copies the data coming from the "outside world" to local memory (and thereby to local cache). It marks the local connections list item as "received", or updates the number of available items in the queue in case there are already unread items in it.

For communication between several parallel threads (or processes), it is required to maintain a single list. In order to enable several parallel threads or processes to maintain a single list for communication, it is a conventional approach to log the list with a "mutex". A "mutex" is an operating system method for making sure that only one thread accesses the item at any point in time. "Mutex" stands for "mutual exclusion" and generally relates to an algorithm for avoiding the simultaneous use of a common resource, such as a global variable.

It is obvious that the exclusion of concurrent access is required for writing. It would not make sense for two threads to write to the same item at the same time. Moreover, concurrent access should even be excluded for reading, since false data could be read if one process was reading from a location which is at the same time being written by a parallel thread. However, it is a drawback of the conventional approach that the mutex involves the operating system, which in the actual implementation of the present embodiment is a process running on another CPU. Therefore "mutex" is a fairly slow process.

According to the described embodiment of the present invention, therefore a different, more localized and significantly faster approach is applied, which is called "hardware handshake".

For performing the "hardware handshake", each data item (for example, the communication list) has an additional communication header, which represents the current state of the item:
    0—free to take
    1—"thread A has released it"
    2—"thread B has locked it"
    3—"thread B has released it"
    4—"thread A has locked it"
    5—"thread A has requested it"
    6—"thread B has requested it"
    7—"thread A has released it without update"
    8—"thread B has released it without update"
    9—"thread A proposes to free"
    10—"thread A proposes to free", etc.

If thread A intends to read or write from the item, it writes the value "5" (request) into the header of the item. The next time that thread B accesses the list, it realizes the request by A and writes "3" (release of interest) into the header. In particular, thread B can designate a shepherd or pre-fetcher ("Proximus daemon"), and therefore the access to the list by thread B occurs once every TLM action, thus very frequently. When A checks the list again, it will find the release and therefore know that it can take control of the list without causing any harm. It will issue "4" (lock) and perform whatever action it intends to do. During this time, the list is known (and marked) to be locked by A. When A is done, it will issue "1" (release by A). This will not go unnoticed by B, which will be able to issue a lock on it itself to read whatever A has done and potentially write new items itself, before releasing it once more. A cannot lock the list as long as it is "locked by B", or even in "released by A" state, but only in "released by B". If in "released by B" state, it can directly lock it (B counts on this), if in "free" state, it has to first issue a request for B to release.

A process can keep an item locked for as long as it needs to, but it is of course good practice to finish as many operations as it can without "waiting" and then handing control back to the other process. If a process achieves control (released by the other process), it needs to do something with this control because the other processes cannot get it back without its cooperation. If it has nothing to do (write), it can pass control right back to that other one. However, the other one might not have anything to write either. In order to prevent this going back and forth in order to create a clean default condition, after two to three bounces, the processes can agree to set it back "free". One process writes the request to free, the other realizes the "request to free" value (instead of the expected "released by the other"), and agrees to setting it to 0. From this time on, the item is up for grabs or either process, just as in the beginning.

The particular processing as described above is called "hardware handshake", as it is similar to practices used in hardware design and, for example, in token ring systems.

At a first glance, the communication described above looks rather complicated. However, it has to be kept in mind that a single CPU can really only do one thing at a time. Any attempt to change this limitation (by rapid task switching) effectively reduces overall efficiency. Since the shepherd or pre-fetcher only need to communicate on every transaction (whenever a single, atomic item has been executed and consumed or produced a data item), the communication scheme is exactly at the correct level of granularity. While the qthread (which may be an actual simulation or system-execution task) has been performed, has consumed or produced data, it hands control back to the shepherd which can now decide to either immediately run another task (or the same one again, depending on priorities and queue fill levels) or to communicate with the system demon. It will, however, in any case at least check communication requests by the system by reading the hardware handshake and potentially acknowledging a proposal to free or simply hand back control.

Lists, such as communication lists, runnable lists etc., have a particular structure and contain additional information such as the hardware handshaking entry and others.

A "last updates" entry always points to the last things that a process has done (changed, wrote) in the list, so that the receiver does not have to search for it (potentially a time consuming procedure).

"Priorities" are entry points to items for which the priority has changed. The priority change may occur, for example, because an item is of high importance for the system execution speed as it is being executed on an expensive resource, for instance a GPU. If the queue fill level for these has been reduced below a threshold, the priority can be raised. The raised priority can be passed on through the system along the connections defined and course the source of a potential bottleneck to be executed with higher priority. Priorities are not simply numbers, they are vectors with a direction (forward, backward), course and urgency.

Time tags are used to mark the time communication items that have been posted or consumed. They are used in a simulation/profiling mode to determine the simulated performance of the system and bottlenecks, but can also be used to profile and optimize the actual execution. For example, older items should be serviced before they become removed from cache in order to prevent them having to be read back from main memory and stalling the system.

The unit "time" in the time tags is not a universal, system-wide time, which would require slow system calls or—even worse—a clock tick to be maintained globally. It is a system of local times which are kept and maintained between threads/processors and have no global meaning. A sender posts the data item with a certain time tag (only meaningful to itself), a receiver acknowledges this post with its own relative time and in turn posts its relative time after which the item was consumed. The sender can now determine the time it took in its unit, and how long it has taken the sender to consume the item.

Characterization data are included to characterize a task to take a certain time to execute in real time. Alternatively, a task can have an execution time associated with it in a certain target system (in simulation profiling), or, for data dependent time, it can have a list of data dependent entries which after the execution of the task can be multiplied with the actual execution numbers (for instance, times a certain loop was executed) and added to an overall execution time number. Depending on the meaning of the data, there can be many entries and they can have absolute or statistical meaning (for example, execution time on the local CPU will most likely be a statistical number, while a simulation of the task on a deterministic system, for instance ASIC, will have absolute numbers).

From the description of the hardware handshake mechanism in the above embodiment, it becomes apparent that this can only work efficiently between two parties such as thread A and thread B. Since the entire system has most likely many more threads than only two, there need to be more levels of this mechanism.

Each shepherd has lots of connections—typically at least one sending and one receiving per qthread, many of which stay within the same pthread, (thus being connections between qthread children of the shepherd), but many will go to "the rest of the world", i.e. to tasks of pthreads that are associated to processing units different from the local one, whereon the shepherd runs. The scheme is illustrated in FIG. 7.

Those connections that go to the world will be handled by a local daemon, and the above described handshake mechanism will take place. As long as the connections stay within the same NUMA node (thus handled by the same daemon), nothing additional is required. Local lists are updated, and pointers to the new items are passed. Data items are effectively passed directly from sender to receiver, since the lists do contain pointers to the actual data objects. Shepherd and daemon only maintain the information that the information communication has in fact taken place.

The situation changes when the communication goes to other NUMA nodes, GPU adapters, FPGA boards or even outside the computer. In this case, first of all it is not enough to pass a pointer to the receiver, as the pointer does not point to anything in the receiver's local memory. In an NUMA system, this would actually work since the system can act as a large, uniform, shared memory space, but it is not efficient. With respect to communications to the other systems, (for example to a different computer) it would not work at all.

Therefore at the system level, there is another level of the communication. Each daemon/pre-fetcher maintains a communication list with all others (or with a higher level hierarchical version) and passes the information about a communication item as described before.

Once it has arrived (directly or hierarchically) at the recipient, the receiving node pre-fetcher then actually copies the data (in this case the actual payload) to the local memory and into L3 cache, while of course also marking the communications list of the recipient shepherd.

The shepherd can now decide (once its gets control back from the last executed task) to execute the recipient qthread—the data is available in local memory and even cache unless it waits too long and the item becomes removed from cache. The method of avoiding global items being dropped from local cache before being used is for the shepherd to treat them with higher priority than the local communication, but of course this has its drawbacks and has to be done carefully. If therefore a problem arises in a pthread, this gives a hint that the system partitioning is suboptimal. Tasks from this pthread should probably be moved to other pthreads. A respective part of the processing is handled by the time tags, which mark when items have been posted. A shepherd can choose to characterize individual tasks/qthreads in terms of how long they take to execute in order to determine when an item might expire from cache. Simply always executing the oldest item first could lead to a detrimental death-spiral in the case that it has already expired from cache, slowing the process until it is retrieved, which in turn causes the next item to expire and so on. Thus, an item should be executed according to its system priority, but before it is likely to expire. Low priority items are better left to expire and then executed when there is time for them. If a shepherd frequently needs to take the decision to let items expire, then it is overloaded and tasks should be moved to other processing units such as CPUs or NUMA nodes.

It is possible to employ the processing described above to dynamically optimize performance by moving tasks from an overloaded CPU or node to a lesser loaded one. Of course, communication overheads must be kept in mind. A specific task becomes a candidate for movement if its time characteristics closely match the level of overload on the local CPU. It has less local communication, and ideally global communication to a node which still has room for its time characteristics (typical execution time multiplied by execution frequency). Other implications to this movement are implicit parallelism (better to move to a CPU with nodes that are not beneficial to run in parallel, better to move away from a CPU with other tasks which are beneficially run in parallel), closeness to specific nodes (for instance, connection with the GPU, should be on a node which is directly attached to southbridge) or to other computers.

According to a further embodiment of the present invention, a scheduling system for a computing system comprising plural processing units for parallel processing of tasks is provided. The scheduling system comprises a grouping means for grouping a plurality of tasks into a plurality of task groups. The scheduling system further comprises a first scheduler for scheduling the task groups over the plurality of processing units according to a preemptive multitasking scheme, so that a single one of the task groups becomes assigned to an individual one of the processing units. Moreover, the scheduling system comprises a second scheduler for scheduling the tasks of the task group at the single processing unit according to a non-preemptive multitasking scheme.

According to a specific embodiment of the present invention, a method of scheduling tasks to be performed in a computing system is provided. The computing system comprises plural processing units for parallel processing of tasks. The method comprises the step of grouping a plurality of tasks into a plurality of task groups. The method further comprises a step of scheduling the task groups over the plurality of processing units according to a preemptive multitasking scheme, so that a single one of the task groups becomes assigned to an individual one of the processing units. It further comprises the step of scheduling the tasks of the task group at the single processing unit according to a non-preemptive multitasking scheme.

The grouping means of the scheduling system may be included in the first scheduler. The scheduling system may form a part of the computing system.

The plurality of tasks to be grouped and scheduled are the result of a decomposition of a single application. The decomposition of a single application is a particularly important field of applying the present invention, since tasks belonging to different applications are normally completely independent of each other and can be processed in parallel in a straightforward manner. According to a preferred embodiment of the present invention, tasks within a single task group are scheduled according to priority. Priority is given to tasks producing output data to be utilized in other tasks running in parallel. Thus, a waste of execution time is avoided.

According to a further embodiment of the present invention, a communication method performed in the computing system for communicating data items between a sender and a receiver is provided. The method comprises the step of writing a data item to be transmitted from the sender to the receiver into a communication FIFO. The method further comprises the step of loading the data item from the communication FIFO into a local memory and/or cache that is associated with the receiver.

A scheduler may issue a signal indicating to the receiver when new data is available at the communication FIFO. Alternatively, the method may further comprise the step of polling the communication FIFO for newly written data items to be loaded into the local memory and/or cache. The processes of polling and loading are performed by a pre-fetcher, which is a thread or process in the same CPU as the receiver, but separate from the receiver. Both embodiments enable the receiver to find the new item already cached when processing has to start. This avoids the receiver having to wait for the data.

According to an embodiment, the sender and receiver are tasks that are performed in parallel on different processing units of the computing system, or correspond to different processing units of the computing system, respectively.

The loading step may pre-fetch the data item already written to the communication FIFO into the local cache before the receiver needs the data item.

Data items may include a communication header indicating a current access status of the data item. The data header is employed to ensure that only a single processing thread accesses a particular data item at any point in time.

The method may further comprise the step of writing the data item to the local memory/cache of the sender, which is allocated on the local sender's node. Thereby, cache coherency can be achieved.

According to a particular embodiment of the present invention, a communication method is applied for the communication of tasks that have been scheduled by a scheduling method according to the specific embodiment mentioned above for being executed in parallel at a first processing unit and a second processing unit.

It is noted that the foregoing description is not limited in any particular implementation of apparatuses performing the operations described. Computing systems for implementing the application may be specially constructed apparatuses as well as general purpose computers or parts thereof. Neither, the present invention is limited to a particular operating system (OS) platform. In addition, the present invention is not described with reference to any particular programming language. It should be appreciated that a variety of programming languages/description languages may be used to implement the teachings of the invention as described therein above. The above described exemplary embodiments of the present invention are not to be considered limiting to the present invention as defined in the appended claims. Features and embodiments of the present invention as described throughout the present specification may be combined as far as possible, if not explicitly stated otherwise.

In summary, the present invention provides a particular efficient system of scheduling of tasks for parallel processing, and data communication between tasks running in parallel in a computer system. A particular field of application of the present invention is the platform-independent simulation of decomposition/partitioning of an application, in order to obtain an optimal implementation for parallel processing.

The invention claimed is:

1. A computing system comprising:
a plurality of processors for parallel processing of tasks, and
a distributed scheduling system including:
a group divider that groups a plurality of individual tasks belonging to one application into a plurality of task groups by taking into account application-specific functional dependencies between the individual tasks and a number of data communication processes between the individual tasks based on the functional dependencies, wherein the data communication processes are established by defining a number of ports and connecting the ports through a number of data communication channels;
a first scheduler operating at the computing system level, to schedule the task groups together with other functions of the computing system not belonging to the one application over the plurality of processors, such that only a single one of the task groups is assigned to an individual one of the plurality of processors, and
a plurality of second schedulers operating at each of the plurality of processors to schedule the tasks of each of the task groups assigned to the respective individual processor according to a non-preemptive multitasking scheme,
wherein the distributed scheduling system further schedules direct communication between a first task that is performed at a first of the plurality of processors and a second task performed at a second of the plurality of processors such that all data items resulting from the first task that have to be used by the second task are transmitted together, via one of the data communication channels, to at least one of: a local memory or a local cache communicably coupled to the second processor acting as a receiver; as soon as the data items are available in at least one of: a local memory or a local cache communicably coupled to the first processor, which acts as a sender, and wherein the second scheduler operating at the second processor schedules the second task to begin as soon as the data items has been transmitted.

2. The computing system according to claim 1, wherein the data communication channels are implemented by a communication First In First Out (FIFO) structure.

3. The computing system according to claim 2, wherein the second scheduler operating at the second processor polls the communication FIFO structure for newly written data items to be loaded into the local memory or the local cache communicably coupled to the second processor.

4. The computing system according to claim 2, wherein the second scheduler operating at the first processor issues a signal indicating to the receiver that newly written data is available in the communication FIFO structure to be loaded into the local memory or the local cache communicably coupled to the second processor.

5. The computing system according to claim 1, wherein the plurality of processors include at least one of: a plurality of central processing units (CPUs) and a plurality of graphical processing units (GPUs).

6. The computing system according to claim 1, wherein local memory communicably coupled to each of the plurality of processors form an address space of a shared memory.

7. The computing system according to claim 6, comprising at least one Non-Uniform Memory Architecture (NUMA) node.

8. A nontransitory computer readable medium that stores computer-executable code for performing, when executed on a computer system comprising a plurality of processors, an application designed by a design process enabling parallel processing of tasks belonging to the application, wherein the design process comprises:

grouping a plurality of individual tasks belonging to the application into a plurality of task groups by taking into account application-specific functional dependencies between individual tasks and a number of data communication processes between the individual tasks based on the functional dependencies, wherein the data communication processes are established by defining a number of ports and connecting the ports through a number of data communication channels;

scheduling, at the computing system level, the task groups together with other functions of the computing system not belonging to the application over the plurality of processors, such that only a single one of the task groups is assigned to an individual one of the plurality of processors, and scheduling, at each of the plurality of processors, the tasks of each of the task groups assigned to the respective individual processor according to a non-preemptive multitasking scheme;

scheduling direct communication between a first task that is performed at a first of the plurality of processors and a second task performed at a second of the plurality of processors such that all data items resulting from the first task that have to be used by the second task are transmitted together, via at least one of the data communication channels, to at least one of: a local memory or a local cache communicably coupled to the second processor acting as a receiver, as soon as the data items are available in at least one of: a local memory or a local cache communicably coupled to the first processor, which acts as a sender; and scheduling, at the second processor, the second task to begin as soon as the data items has been transmitted.

9. The nontransitory computer readable medium according to claim 8, wherein the design process further comprises mapping the application onto an execution platform.

10. The nontransitory computer readable medium according to claim 9, wherein the design process further comprises simulating the performance of the application on said execution platform.

11. The nontransitory computer readable medium according to claim 8, wherein the data items include a communication header indicating a current access status of the data items.

12. A method of executing an application including a plurality of individual tasks on a computing system comprising a plurality of processors, by means of parallel processing of tasks belonging to the application, the method comprising:

grouping the plurality of individual tasks belonging to the application into a plurality of task groups by taking into account application-specific functional dependencies between individual tasks and a number of data communication processes between the individual tasks based on the functional dependencies, wherein the data communication processes are established by defining a number of ports and connecting the ports through a number of data communication channels;

scheduling, at the computing system level, the task groups together with other functions of the computing system not belonging to the application over the plurality of processors, such that only a single one of the task groups is assigned to an individual one of the plurality of processors, and scheduling, at each of the plurality of processors, the tasks of each of the task groups assigned to the respective individual processor according to a non-preemptive multitasking scheme;

scheduling direct communication between a first task that is performed at a first of the plurality of processors and a second task performed at a second of the plurality of processors such that all data items resulting from the first task that have to be used by the second task are transmitted together, via at least one of the data communication channels, to at least one of: a local memory or a local cache communicably coupled to the second processor acting as a receiver, as soon as the data items are available in at least one of: a local memory or a local cache communicably coupled to the first processor, which acts as a sender; and scheduling, at the second processor, the second task to begin as soon as the data items has been transmitted.

13. The method according to claim 12, wherein the scheduling at the computing system level is performed according to a preemptive multitasking scheme.

14. The method according to claim 12, wherein the at least one data communication channel is implemented by means of a communication First In First Out (FIFO) structure, and wherein the method further comprising polling the communication FIFO structure for newly written data items to be loaded into the local memory or the local cache communicably coupled to the second processor.

15. The method according to claim 12, wherein the at least one data communication channel is implemented by means of a communication First In First Out (FIFO) structure, and wherein the first processor issuing a signal indicating to the receiver that newly written data items are available in the communication FIFO structure to be loaded into the local memory or the local cache communicably coupled to the second processor.

16. The method according to claim 12, wherein the transmitted data items are pre-fetched into the local cache of the second processor.

17. The method according to claim 12, wherein the scheduling at each individual processor takes into account input/output dependencies between individual tasks.

* * * * *